(12) United States Patent
Jiao et al.

(10) Patent No.: US 8,436,854 B2
(45) Date of Patent: May 7, 2013

(54) GRAPHICS PROCESSING UNIT WITH DEFERRED VERTEX SHADING

(75) Inventors: Guofang Jiao, San Diego, CA (US); Yun Du, San Diego, CA (US); Lingjun Chen, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 903 days.

(21) Appl. No.: 12/557,427

(22) Filed: Sep. 10, 2009

(65) Prior Publication Data

US 2010/0302246 A1 Dec. 2, 2010

Related U.S. Application Data

(60) Provisional application No. 61/182,414, filed on May 29, 2009.

(51) Int. Cl.
*G06T 15/40* (2011.01)

(52) U.S. Cl.
USPC .......................................... 345/421; 345/582

(58) Field of Classification Search .................. 345/421, 345/582
See application file for complete search history.

(56) References Cited

U.S. PATENT DOCUMENTS

| 5,986,669 | A | * | 11/1999 | Kirkland .................. 345/620 |
| 7,292,239 | B1 | * | 11/2007 | Moreton et al. ............. 345/419 |
| 7,400,325 | B1 | * | 7/2008 | Gimby et al. ............... 345/421 |
| 7,468,726 | B1 | * | 12/2008 | Wloka et al. ............... 345/421 |
| 2004/0196281 | A1 | | 10/2004 | Huang |
| 2008/0030513 | A1 | * | 2/2008 | Jiao et al. ................. 345/530 |

OTHER PUBLICATIONS

International Search Report and Written Opinion—PCT/US2010/036661—ISA/EPO—Jan. 30, 2012.

* cited by examiner

*Primary Examiner* — Maurice L McDowell, Jr.
(74) *Attorney, Agent, or Firm* — Matthew J. Evans; James R. Gambale, Jr.

(57) ABSTRACT

Techniques are described for processing graphics images with a graphics processing unit (GPU) using deferred vertex shading. An example method includes the following: generating, within a processing pipeline of a graphics processing unit (GPU), vertex coordinates for vertices of each primitive within an image geometry, wherein the vertex coordinates comprise a location and a perspective parameter for each one of the vertices, and wherein the image geometry represents a graphics image; identifying, within the processing pipeline of the GPU, visible primitives within the image geometry based upon the vertex coordinates; and, responsive to identifying the visible primitives, generating, within the processing pipeline of the GPU, vertex attributes only for the vertices of the visible primitives in order to determine surface properties of the graphics image.

50 Claims, 10 Drawing Sheets

GRAPHICS PROCESSING UNIT WITH DEFERRED VERTEX SHADING

CLAIM OF PRIORITY UNDER 35 U.S.C. §119

The present application for patent claims priority to Provisional Application No. 61/182,414 filed May 29, 2009, which is incorporated by reference herein in its entirety and to which priority is claimed.

TECHNICAL FIELD

This disclosure relates to the processing of graphics images using a graphics processing unit.

BACKGROUND

A graphics processing unit (GPU) is a dedicated graphics rendering device utilized to manipulate and display graphics images on a display device. GPUs are often built with a highly-parallel structure that provides more efficient processing than typical, general-purpose central processing units (CPUs) for a range of complex algorithms. For example, the complex algorithms may correspond to processing representations of three-dimensional computerized graphics. A GPU may implement a number of primitive graphics operations, such as forming points, lines, and triangles, to create complex, two-dimensional or three-dimensional images on a display device more quickly than drawing the images directly to the display device with a CPU.

Vertex shading and fragment (pixel) shading are often utilized in the video gaming industry to determine final surface properties of a computerized image. GPUs typically include at least three major pipeline stages in a typical shader-based graphics core: a vertex shader stage, a primitive setup and interpolation stage, and a fragment shader stage.

A vertex shader may be applied to an image geometry for an image and may generate vertex coordinates and vertex attributes for primitives contained within the image geometry. Vertex attributes may include, for example, color, normal, and texture coordinates associated with a vertex. A primitive setup module may form primitives, such as points, lines, or triangles. Primitives for the image geometry may be converted into pixels, and hidden primitive and pixel removal (hidden surface removal) may be performed. An attribute interpolator then interpolates the attributes over pixels within the primitives for the image geometry, and sends the interpolated attribute values to the fragment shader for pixel rendering. Results from the fragment shader may then be output to a post-processing block and a frame buffer for presentation of the processed image on the display device.

In certain instances, a device may perform multiple passes, or iterations, through a specific GPU processing pipeline in order to render image data. A first pass through the GPU pipeline may only fetch attributes and perform vertex shading computation related to vertex coordinates and position. During the first pass, the GPU pipeline may reject invisible primitives, and may store information related to the visible primitives in a memory buffer. In a second, subsequent pass through the GPU pipeline, the GPU pipeline retrieves the information from the memory buffer, processes only the visible primitives, and completes the vertex shading computations.

SUMMARY

Techniques are described for processing graphics images with a graphics processing unit (GPU) using deferred vertex shading. For example, a GPU may include a graphics processing pipeline that processes graphics images using multiple vertex shaders. A first vertex shader may generate vertex coordinates for the vertices of primitives contained within a particular image geometry that represents a graphics image, such that visible primitives may be identified. A second, different vertex shader may then generate vertex attributes only for the vertices of the visible primitives in order to determine surface properties of the graphics image. In such fashion, the GPU may minimize or eliminate the need to perform certain computationally intensive functions for vertex fetching and shading of vertices associated with non-visible primitives or hidden surfaces, which may help reduce power consumption and improve performance within the GPU. Further, the GPU may be capable of performing these various tasks during a single pass, rather than multiple passes, through its GPU graphics processing pipeline.

In one example, a method includes the following: generating, within a processing pipeline of a graphics processing unit (GPU), vertex coordinates for vertices of each primitive within an image geometry, wherein the vertex coordinates comprise a location and a perspective parameter for each one of the vertices, and wherein the image geometry represents a graphics image; identifying, within the processing pipeline of the GPU, visible primitives within the image geometry based upon the vertex coordinates; and, responsive to identifying the visible primitives, generating, within the processing pipeline of the GPU, vertex attributes only for the vertices of the visible primitives in order to determine surface properties of the graphics image.

In one example, a device includes a graphics processing unit (GPU). The GPU is configured to generate, within a processing pipeline of the GPU, vertex coordinates for vertices of each primitive within an image geometry, where the vertex coordinates comprise a location and a perspective parameter for each one of the vertices, and where the image geometry represents a graphics image. The GPU is also configured to identify, within the processing pipeline of the GPU, visible primitives within the image geometry based upon the vertex coordinates, and, responsive to identifying the visible primitives, to generate vertex attributes only for the vertices of the visible primitives in order to determine surface properties of the graphics image.

In one example, a computer-readable storage medium comprises executable instructions for causing one or more processors to: generate, within a processing pipeline of a graphics processing unit (GPU), vertex coordinates for vertices of each primitive within an image geometry, wherein the vertex coordinates comprise a location and a perspective parameter for each one of the vertices, and wherein the image geometry represents a graphics image; identify, within the processing pipeline of the GPU, visible primitives within the image geometry based upon the vertex coordinates; and, responsive to identifying the visible primitives, to generate, within the processing pipeline of the GPU, vertex attributes only for the vertices of the visible primitives in order to determine surface properties of the graphics image.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. Software comprising instructions to execute the techniques may be initially stored in a computer-readable medium and loaded and executed by a processor.

Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more aspects are set forth in the accompanying drawings and the description below. Other features, objects, and advantages will be apparent from the description and drawings, and from the claims.

DETAILED DESCRIPTION

Figure 1:
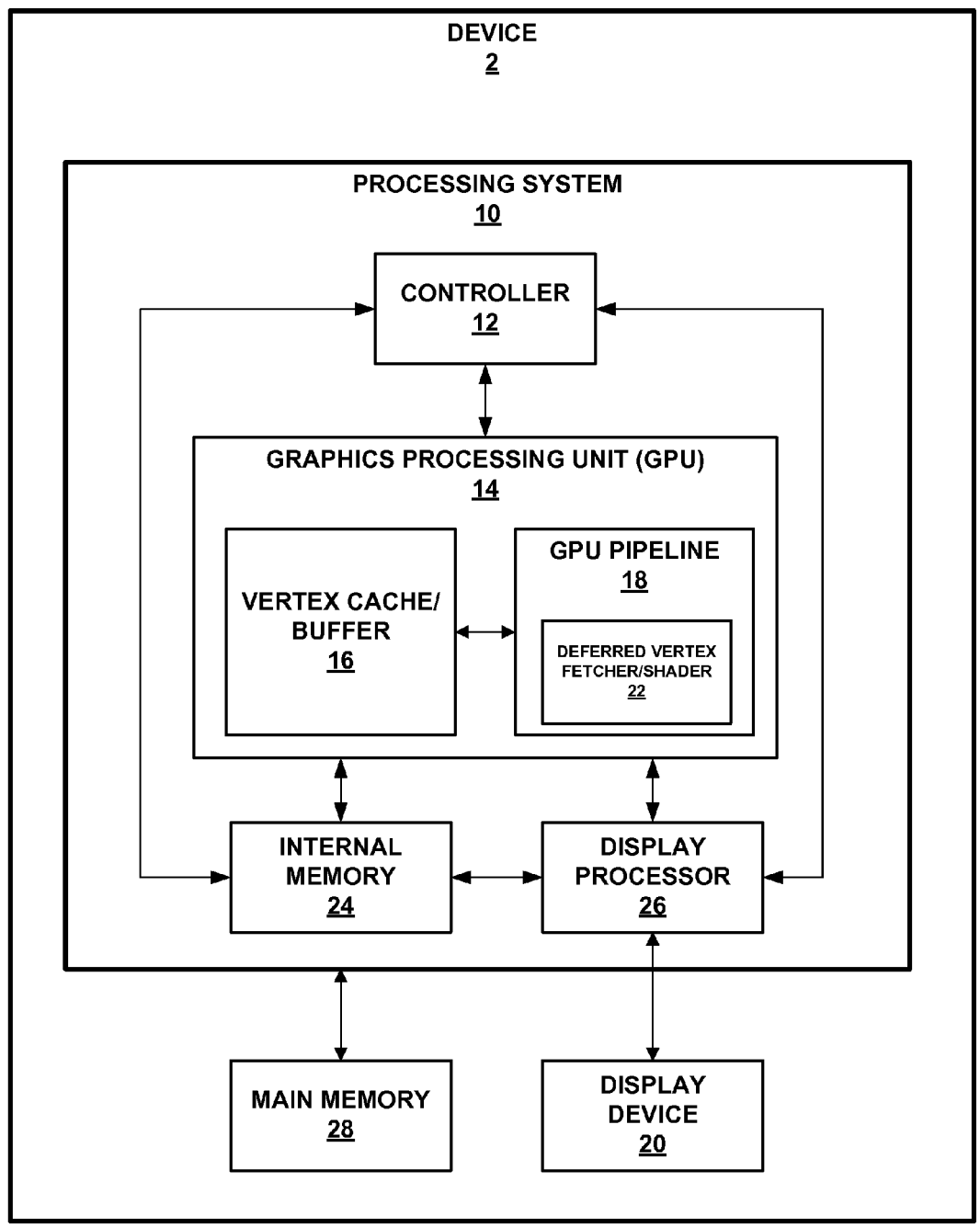
FIG. 1 is a block diagram illustrating an example device including a graphics processing unit (GPU) that implements a deferred vertex fetcher/shader mechanism for image processing.

FIG. 1 is a block diagram illustrating an example device 2 that includes a graphics processing unit (GPU) 14 to implement a deferred vertex fetcher/shader mechanism for image processing. In the example of FIG. 1, device 2 includes a processing system 10 that is coupled to a main memory device 28 and a display device 20. Processing system 10 includes a controller 12, GPU 14, an internal memory device 24, and a display processor 26. Controller 12, GPU 14, and/or display processor 26 may write data to or read data from internal memory 24 and/or main memory 28. Internal memory 24 may, in some instances, comprise cache memory.

Device 2 may comprise a stand-alone device or may be part of a larger system. For example, device 2 may comprise, or be part of, a wireless communication device (such as a wireless mobile handset), a digital camera, a video camera, a video telephone, a digital multimedia player, a personal digital assistant (PDA), a video game console, a personal computer or laptop device, or other device capable of display graphics data. Device 2 may also be included within one or more integrated circuits, or chips, which may be used in some or all of the devices described above.

Within processing system 10, controller 12 is capable of controlling the operation of other processors in processing system 10, such as GPU 14 and/or display processor 26. In accordance with the techniques described herein, GPU 14 includes a GPU pipeline 18 and vertex cache/buffer 16 coupled to GPU pipeline 18. Vertex cache/buffer 16 may comprise an on-chip buffer that is part of the same integrated circuit, or chip, as GPU 14. Incorporation of vertex cache/buffer 16 may reduce an amount of data passing through GPU pipeline 18 within GPU 14.

In some instances, GPU 14 may receive an image geometry representing a graphics image, along with one or more commands or instructions for rendering and displaying the image, from controller 12. The image geometry may correspond to a representation of a two-dimensional (2D) or three-dimensional (3D) computerized graphics image. GPU 14 processes the image geometry, in accordance with the rendering commands, to present an image effect, a background image, a video gaming image, or other image, for example, to a user of device 2 via display device 20. Over time, GPU 14 may process one or more of such image geometries for images that may be displayed as video frames in a sequence of video frames. Display device 20 may comprise a liquid crystal display (LCD), a cathode ray tube (CRT) display, a plasma display, or another type of display device integrated with or coupled to processing system 10 via display processor 26.

In some cases, controller 12 may receive one or more image geometries from applications operating within device 2, such as a video gaming application. In other cases, controller 12 may receive one or more image geometries from applications operating external to device 2, such as an external server coupled to device 2 via a wired or wireless network. For example, device 2 may receive an image geometry from an external server via a streaming media or broadcast media.

After receiving an image geometry from controller 12, GPU 14 may process the image geometry to prepare the corresponding image for presentation on display device 20 via display processor 26. For example, GPU 14 may implement a number of primitive graphics operations, such as forming points, lines, and triangles, to create a 2D or 3D image represented by the received image geometry on display device 20. Display processor 26 may perform certain operations, such as scaling, rotation, or other operations prior to display of the image on display device 20.

Typically, GPU pipeline 18 includes various processing stages to process primitives of an image geometry. Primitives are the simplest types of geometric figures, including points, lines, triangles, and other polygons, and may be formed with one or more vertices within the image geometry. Primitives or portions of primitives may be rejected from consideration during processing of a specific frame of the image when the primitives or the portions of primitives are invisible (e.g., located on a backside of an object) within the image frame, and hidden surfaces of visible primitives may also be removed. Hidden surfaces are those that may be located behind another object, or transparent, within the image frame.

For example, GPU pipeline 18 may, as shown in the examples of FIGS. 2A-2B and FIGS. 3A-3B, include vertex fetching and decoding operations to fetch and decode certain information corresponding to the vertices of the primitives, which is then utilized for vertex shading operations. As shown in FIG. 1, GPU pipeline 18 includes a deferred vertex fetcher/shader 22 which, as will be described in further detail below, includes multiple vertex fetcher/decoder stages and multiple vertex shading stages. A first vertex fetcher and decoder may fetch and decode certain coordinate attributes associated with vertices of primitives contained within an image geometry, and provide these to a first vertex shader. Coordinate attributes are attributes input to a vertex shader and contributing to the computation of vertex location and perspective parameters in the vertex shader. The first vertex shader may generate vertex coordinates for the vertices of each primitive within the image geometry, where the vertex coordinates may comprise a location and a perspective parameter.

The first vertex shader may store the vertex coordinates within vertex cache/buffer 16. In some instances, vertex cache/buffer 16 may include a dedicated storage area to store vertex coordinates. Vertex coordinates may identify the vertices of primitives within an image geometry based on, for example, a four-dimensional coordinate system with X, Y, and Z coordinates (e.g., XYZ coordinates on the X, Y, Z axes) that identify a location of a vertex within the image geometry, and a W coordinate that comprises a perspective parameter for the image geometry.

A primitive setup element of GPU pipeline 18 may retrieve the vertex coordinates stored in vertex cache/buffer 16, and use these coordinates to identify visible primitives within the image geometry. Responsive to identifying the visible primitives, a second fetcher and decoder may fetch and decode certain non-coordinate attributes (e.g., attributes not associated with coordinate information) for vertices of the visible primitives, and may provide these to a second vertex shader. Non-coordinate attributes are attributes input to a vertex shader and contributing to the computation of attributes other than coordinate location and perspective parameters in the vertex shader. In some instances, coordinate attributes may have certain attributes that overlap with non-coordinate attributes, since these attributes may contribute to the computations of both vertex location and other attributes.

Upon receipt of the non-coordinate attributes, the second vertex shader may then generate vertex attributes only for the vertices of the visible primitives in order to determine surface properties of the graphics image. Vertex attributes, for example, may include color, normal, and texture coordinates associated with any given vertex.

In such fashion, GPU pipeline 18 may minimize or eliminate the need to perform certain computationally intensive functions for fetching and vertex shading for certain non-visible and/or hidden surfaces. In the past, vertex fetching/decoding and vertex shading has typically been performed for vertices of all primitives in an image geometry prior to primitive setup, regardless of whether the corresponding primitives are visible or invisible. By deferring certain of the vertex fetching/decoding and shading operations, it is possible to provide fetching and shading operations of vertex attributes only with respect to vertices of visible primitives within a given image geometry. This may help reduce power consumption and also improve performance within device 2 by effectively removing unnecessary vertex stream fetching and vertex shading computations. GPU pipeline 18 and deferred vertex fetcher/shader 22 may be implemented in either tiled- or non-tiled rendering architectures.

Figure 2A:
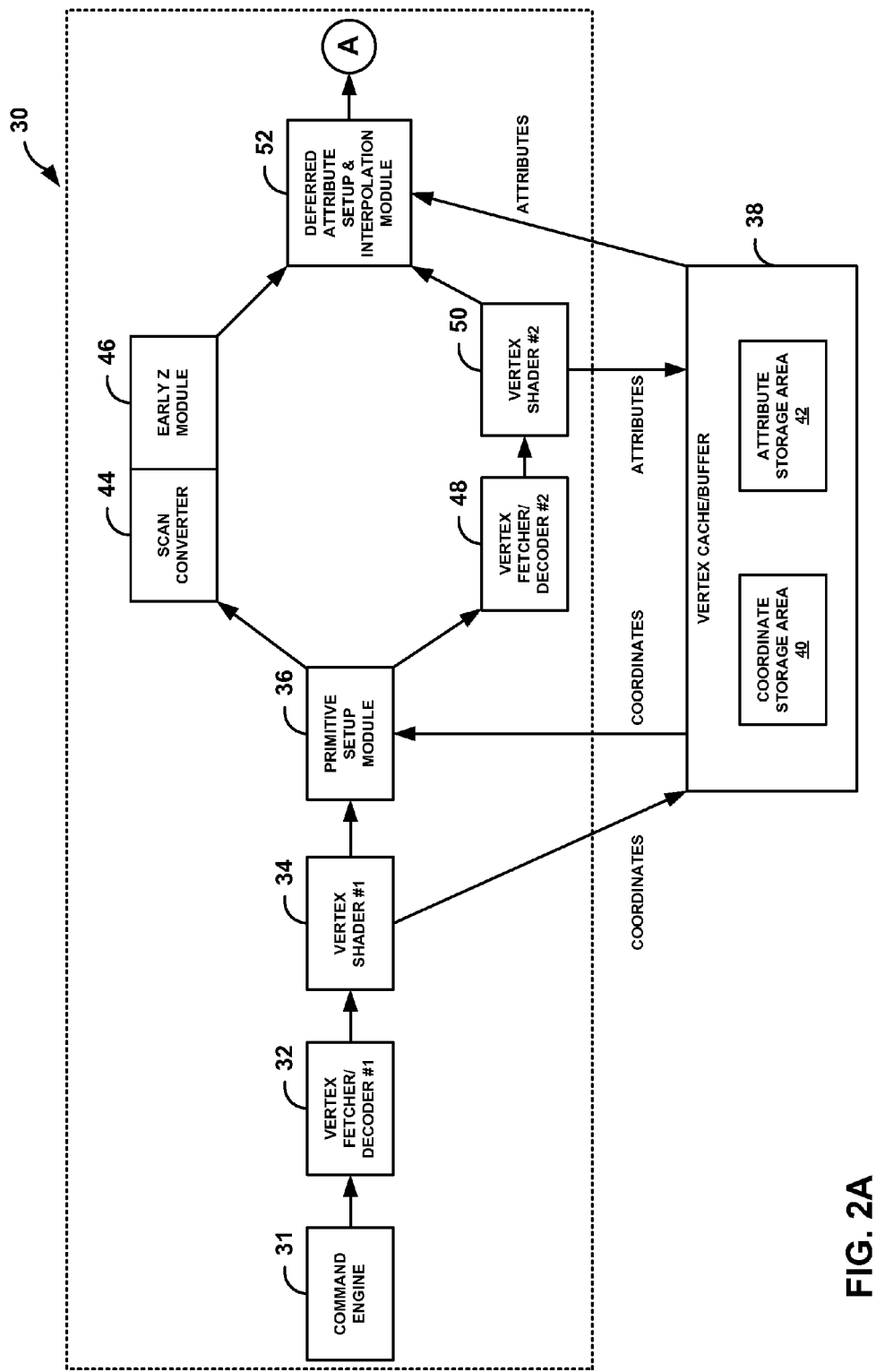
FIGS. 2A-2B are block diagrams of a GPU pipeline that implements multiple vertex fetchers/decoders and multiple vertex shaders for image processing, according to a first example.
Figure 2B:
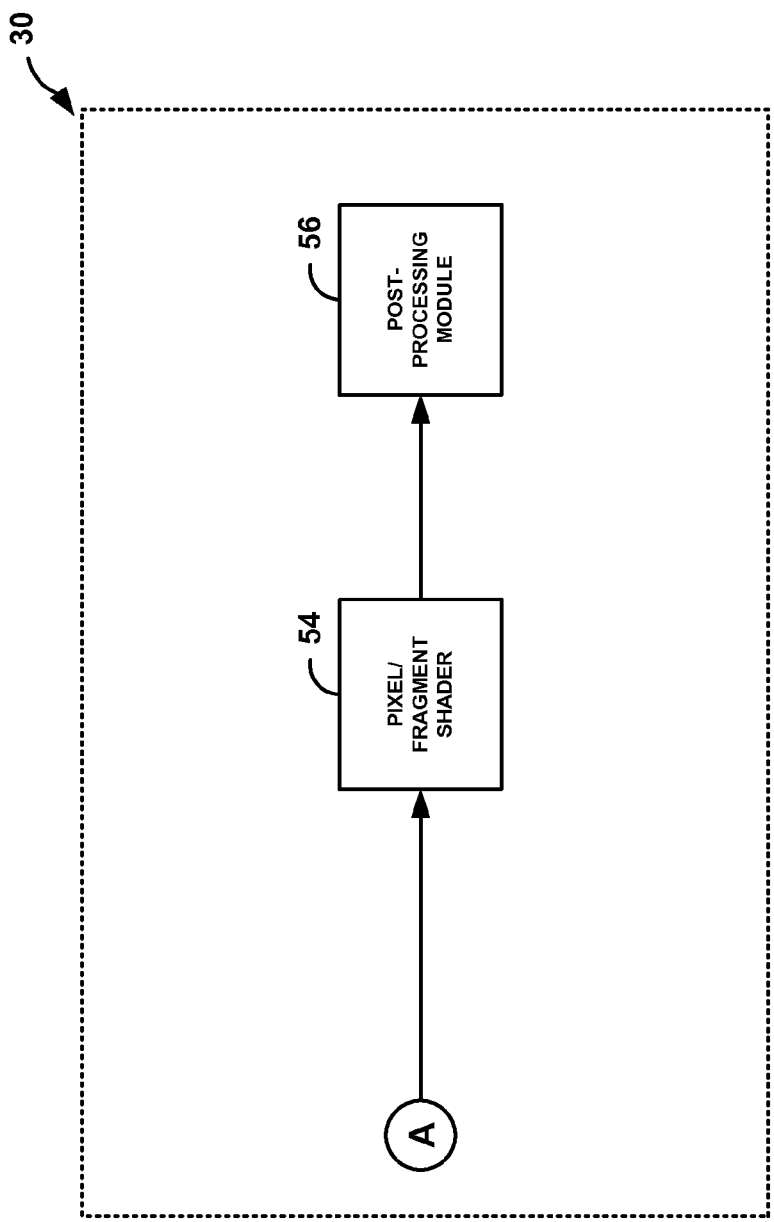

FIGS. 2A-2B illustrate a block diagram of a GPU pipeline 30 that implements multiple vertex fetchers/decoders 32, 48 and multiple vertex shaders 34, 50 for image processing, according to a first example. In this example, GPU pipeline 30 shown in FIGS. 2A-2B may be part of GPU pipeline 18 shown in FIG. 1. Vertex fetcher/decoder 32 (vertex fetcher/decoder #1), vertex shader 34 (vertex shader #1), vertex fetcher/decoder 48 (vertex fetcher/decoder #2), and vertex shader 50 (vertex shader #2) may be part of deferred vertex fetcher/shader 22 shown in FIG. 1, according to one aspect. By implementing multiple vertex fetchers/decoders 32, 48 and multiple vertex shaders 34, 50, GPU pipeline 30 may defer certain functionality until vertex fetcher/decoder 48 (vertex fetcher/decoder #2) and vertex shader 50 (vertex shader #2), and minimize or eliminate the need to perform some of the computationally intensive functions for vertex fetching and shading of vertices for certain non-visible primitives.

In FIG. 2A, command engine 31 may receive image geometry and rendering commands for an image from a controller of the device (e.g., device 2 shown in FIG. 1) in which GPU pipeline 30 resides. The image geometry may correspond to representations of complex, 2D or 3D computerized graphics. Command engine 31 passes the image geometry and rendering commands along GPU pipeline to the other processing stages.

For example, command engine 31 passes vertex indices for vertices of primitives contained within the image geometry to a first vertex fetcher/decoder 32. Vertex fetcher/decoder 32 receives these vertex indices and may then fetch attributes for the vertices. For example, in some cases, vertex fetcher/decoder 32 may first perform hit/miss checking for the attributes in a vertex cache mechanism, such as may be included within vertex cache/buffer 38. (In one aspect, vertex cache/buffer 38 may be part of the vertex cache/buffer 16 shown in FIG. 1.) For any missed vertices, vertex fetcher/decoder 32 may fetch attributes from a memory buffer, such as may be included within internal memory 24 (FIG. 1.).

In the example of FIGS. 2A-2B, the fetched attributes may correspond to attributes associated with the coordinates of the vertices (i.e., coordinate attributes). Coordinate attributes may comprise attributes that are related to a computation of a location of a vertex (e.g., XYZ coordinates on the X, Y, Z axes) and a perspective parameter (e.g., W coordinate) for the image geometry. These coordinate attributes may be used by a first vertex shader 34 for determining actual coordinates (e.g., XYZW coordinates for location and perspective) for the vertices. However, in many instances, vertex fetcher/decoder 32 may decode attribute formats of the fetched coordinate attributes and convert them into internal formats acceptable by vertex shader 34.

Vertex shader 34 is applied to the image geometry and determines surface properties of the image at vertices within the image geometry. In this way, vertex shader 34 generates vertex coordinates of each of the vertices within the image geometry. The vertex coordinates identify the vertices within the image geometry based on, for example, a four-dimensional coordinate system with X, Y, and Z coordinates that identify a location of a vertex within the image geometry, and a W coordinate that comprises a perspective parameter for the image geometry. Upon generation of the vertex coordinates, vertex shader may store the coordinates in vertex cache/buffer 38.

As shown in the example of FIG. 2A, vertex cache/buffer 38 may include distinct, dedicated storage area for different types of vertex data. A coordinate storage area 40 of vertex cache/buffer 38 is capable of storing vertex coordinates that may, for example, be provided by vertex shader 34. An attribute storage area 42 of vertex cache/buffer 38 is capable of storing vertex attributes that may, for example, be provided by a second vertex shader 50, as will be described in further detail below. In some instances, vertex shader 34 may provide, to primitive setup module 36, cache index values for the stored vertex coordinates within coordinate storage area 40 of vertex cache/buffer 38. In these instances, the cache index values may be computed by vertex fetcher/decoder 32 and communicated to vertex shader 34.

Primitive setup module 36 may read vertex coordinates (e.g., X, Y, Z, W coordinates) for primitive vertices out of coordinate storage area 40 of vertex cache/buffer. Primitive setup module 36 may use the cache index values provided by vertex shader 34 to locate the vertex coordinates for retrieval within coordinate storage area 40. Primitive setup module 36 forms primitives with one or more vertices within the image geometry. Primitives are the simplest types of geometric figures and may include points, lines, triangles, and other polygons.

Primitive setup module 36 may perform initial rejection of any invisible primitives. For example, any primitives that may be located outside of a viewport or viewing region may be rejected as invisible primitives. Primitive setup module 36 may also reject primitives by performing scissoring and backface culling using the XY coordinates of the vertices within the primitives. Scissoring and backface culling reject primitives and portions of primitives from consideration during processing of a specific frame of the image when the primitives and the portions of primitives are invisible within the image frame. For example, the primitives and the portions of primitives may be located on a backside of an object within the image frame.

Primitive setup module 36 may provide the visible primitives within the image geometry to scan converter 44, where primitives may be rasterized into pixels based, for example, on the XY coordinates of each of the vertices within the primitives and the number of pixels included in the primitives.

In parallel, primitive setup module 36 may provide vertex indices of the visible primitives to a second vertex fetcher/decoder 48. Vertex fetcher/decoder 48 receives these vertex indices and may then fetch attributes for the vertices. For example, in some cases, vertex fetcher/decoder 48 may first perform hit/miss checking for the attributes in a vertex cache mechanism, such as may be included within vertex cache/buffer 38. For any missed vertices, vertex fetcher/decoder 48 may fetch attributes from a memory buffer, such as may be included within internal memory 24 (FIG. 1).

In the example of FIGS. 2A-2B, the attributes fetched by vertex fetcher/decoder 48 may correspond to attributes that are not associated with the coordinates of the vertices or coordinate operations, and may be referred to as non-coordinate attributes. These non-coordinate attributes may be used by a second vertex shader 50 for computing vertex attributes of the vertices of the visible primitives in the image geometry. Vertex attributes may include, for example, color, normal, and/or texture coordinates associated with a given vertex. Upon calculation, vertex shader 50 may store the vertex attributes within attribute storage area 42 of vertex cache/buffer 38. In one aspect, the vertex attributes are called "varying," using the terminology of the OpenGL/OpenGL SL (Open Graphics Library/Open Graphics Library Shading Language) specification.

As described previously, and as shown in FIGS. 2A-2B, vertex cache/buffer 38 may be logically divided into two areas: coordinate storage area 40 and attribute storage area 42. These two areas of vertex cache/buffer 38 may be managed independently by a GPU (e.g., GPU 14 of FIG. 1) for use by GPU pipeline 30. Coordinate storage area 40 contains vertex coordinates that are generated by vertex shader 34 and use by primitive setup module 36. Attribute storage area 42 contains vertex attributes that are generated by vertex shader 50 and used by attribute setup and interpolation module 52. Vertex shader 50 may provide, to attribute setup and interpolation module 52, the cache index values for the stored vertex attributes within attribute storage area 42 of vertex cache/buffer 38. These cache index values may be computed by vertex fetcher/decoder 48.

In the example of FIG. 2A, vertex fetcher/decoder 48 and vertex shader 50 may roughly cover the pipeline latency, within GPU pipeline 30, of scan converter 44 and early Z module 46. As a result, the operations of fetcher/decoder 48 and vertex shader 50 may roughly be performed in parallel with the operations of scan converter 44 and early Z module 46, which may achieve various performance efficiencies. Early Z module 46 works in conjunction with scan converter 44 to remove hidden surfaces of visible primitives using, for example, the early depth and stencil test based on the Z coordinates of the vertices within the primitives. Primitives or pixels within primitives (e.g., surfaces) may be considered hidden, and therefore be removed from consideration during processing of a specific frame of the image, when the primitives or the pixels within primitives are located behind another object (e.g., another primitive) within the image frame, or are transparent within the image frame.

After vertex attributes have been stored by vertex shader 50 into attribute storage area 42, deferred attribute setup and interpolation module 52 may retrieve these attributes from attribute storage area 42. Attribute setup and interpolation module 52 may use the cache index values provided by vertex shader 50 to locate the vertex attributes for retrieval within attribute storage area 42. Attribute setup and interpolation module 52 may also obtain pixels for primitives from early Z module 46 that have not been rejected. Attribute setup and interpolation module 52 may then interpolate the attributes over pixels within the primitives based, for example, on attribute gradient values.

In one aspect, an attribute gradient comprises a difference between the attribute value at a first pixel and the attribute value at a second pixel within a primitive moving in either a horizontal (X) direction or a vertical (Y) direction. The vertex attributes may be used to compute the attribute gradients. In some cases, the attribute gradient setup rate may heavily depend on the number of vertex attributes associated with the primitives. Thus, by deferring certain functionality of fetching, decoding, and shading, GPU pipeline 30 limits the number of attributes that need to be processed by attribute setup and interpolation module 52, thereby increasing the efficiency at which attribute setup and interpolation module 52 may operate. Deferred attribute setup and interpolation module 52 may only need to retrieve and process vertex attributes for vertices associated with visible primitives, as determined by primitive setup module 36, where hidden surfaces may also have been removed (as determined by early Z module 46). In another aspect, deferred attribute setup and interpolation module 52 may be replaced or implemented by another mechanism, such as a coefficient generator. In this aspect, interpolation may be performed on the generated coefficients.

As shown in FIG. 2B, attribute setup and interpolation module 52 may provide the interpolated attribute values to pixel/fragment shader 54 to perform pixel rendering of the primitives. Pixel/fragment shader 54 may determine surface properties of the image at pixels within the primitives for the image geometry. Results of pixel/fragment shader 54 can then be output to post-processing module 56 to prepare the pixels for display, such as on display device 20 shown in FIG. 1.

In one aspect, vertex shader 34 and vertex shader 50 may physically share the same shader processor (not shown) for implementing GPU pipeline 30 in order to save hardware cost. In one aspect, vertex stream fetcher/decoder 32 and vertex stream fetcher/decoder 48 may share the same stream cache (not shown) in order to save hardware cost.

GPU pipeline 30 may minimize or eliminate the need to perform certain computationally intensive functions for fetching and vertex shading for certain non-visible and/or hidden surfaces. By deferring certain vertex fetching/decoding operations and vertex shading operations, it is possible to provide fetching and shading operations only with respect to vertices of visible primitives within a given image geometry.

This may help reduce power consumption and also improve performance by effectively removing unnecessary vertex stream fetching and vertex shading computations for primitives that have been rejected as invisible.

Figure 3A:
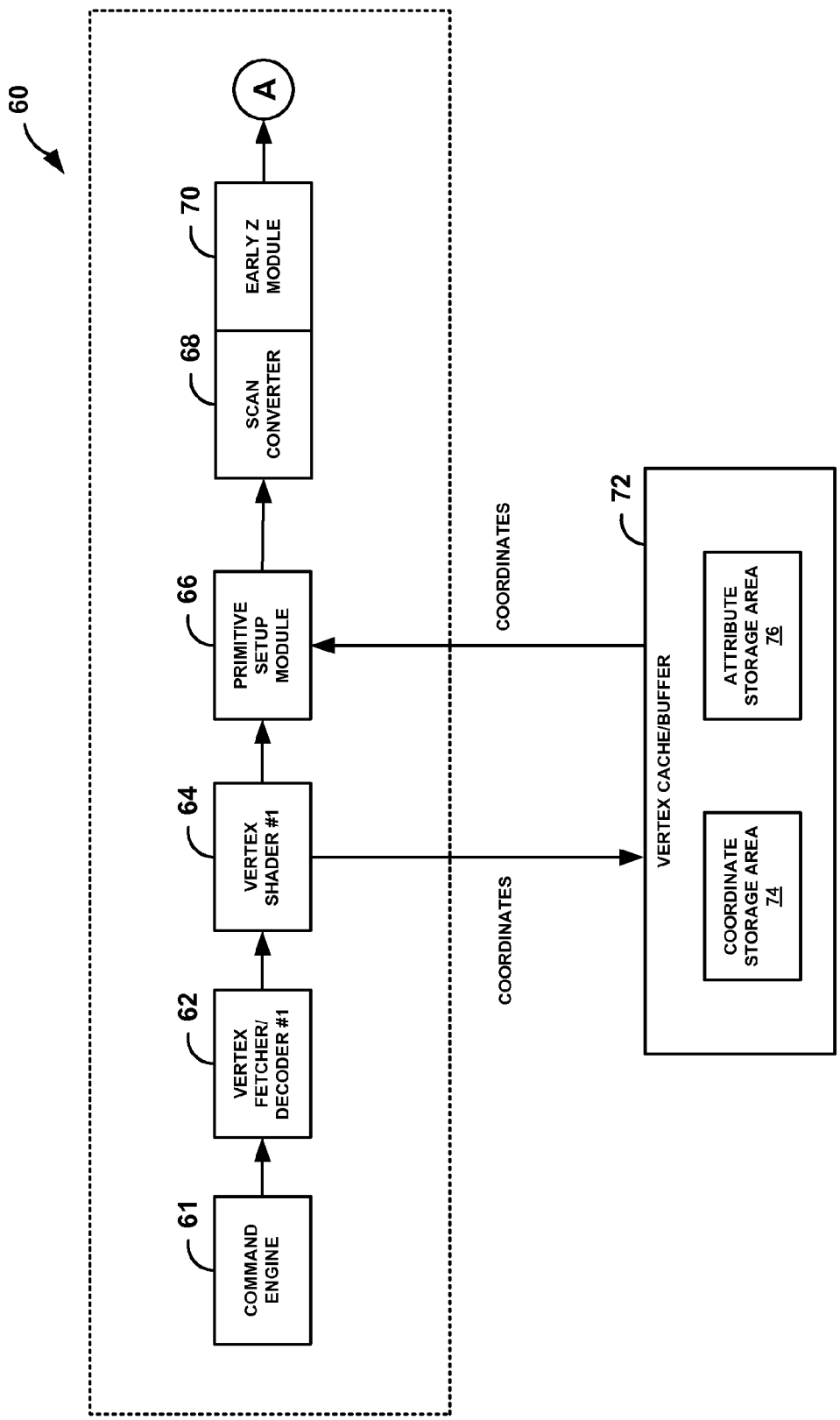
FIGS. 3A-3B illustrate a block diagram of a GPU pipeline that implements multiple vertex fetchers/decoders and multiple vertex shaders for image processing, according to a second example.
Figure 3B:
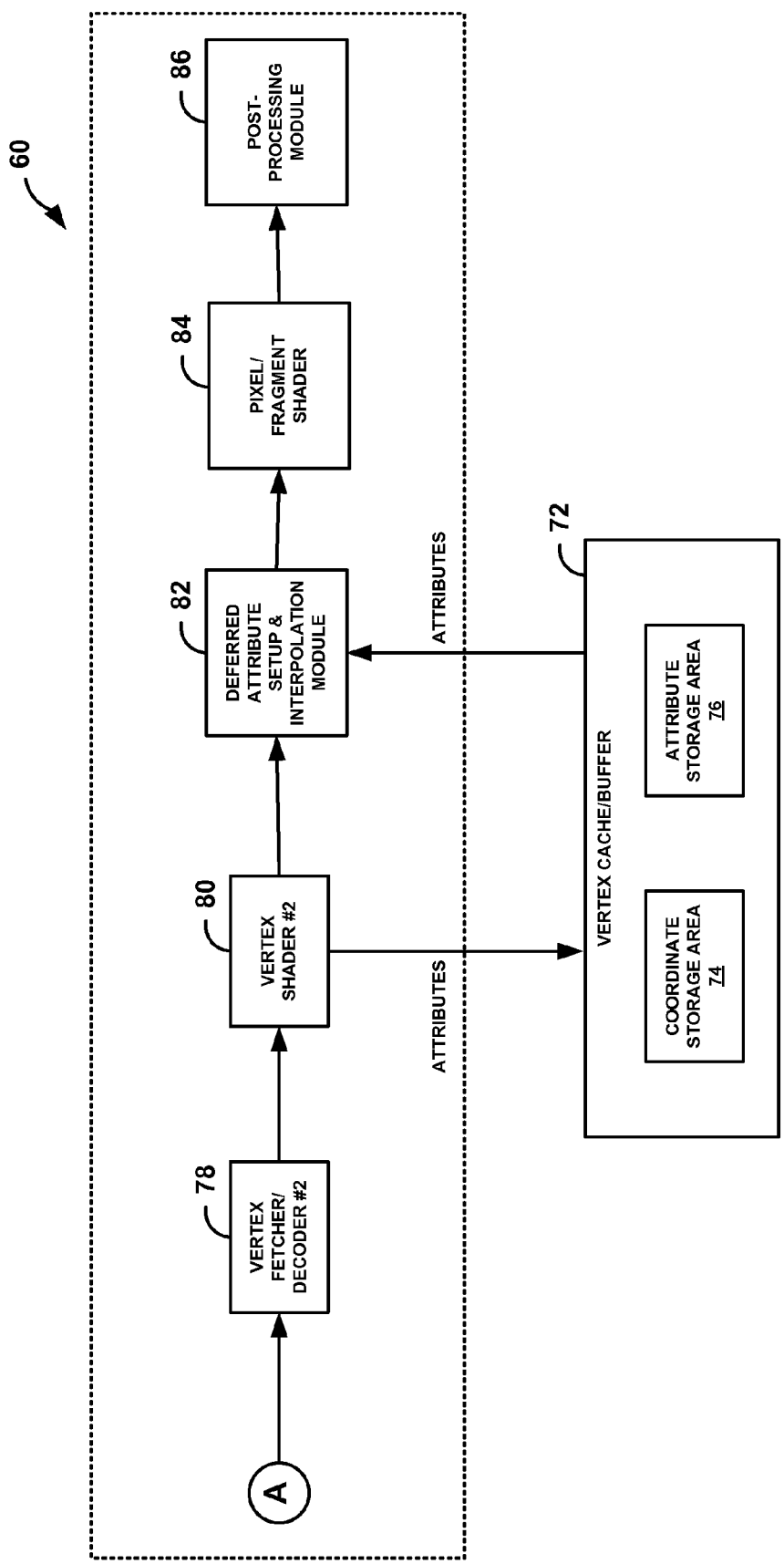

FIGS. 3A-3B illustrate a block diagram of a GPU pipeline 60 that implements multiple vertex fetchers/decoders and multiple vertex shaders for image processing, according to a second example. Similar to GPU pipeline 30 shown in FIGS. 2A-2B, GPU pipeline 60 includes a command engine 61, a first vertex fetcher/decoder 62, a first vertex shader 64, a primitive setup module 66, a scan converter 68, an early Z module 70, a second vertex fetcher/decoder 78, a second vertex shader 80, a deferred attribute setup and interpolation module 82, a pixel/fragment shader 84, and a post-processing module 86. Vertex fetcher/decoder 62 (vertex fetcher/decoder #1), vertex shader 64 (vertex shader #1), vertex fetcher/decoder 78 (vertex fetcher/decoder #2), and vertex shader 80 (vertex shader #2) may be part of deferred vertex fetcher/shader 22 shown in FIG. 1, according to one aspect.

FIGS. 3A-3B also show that GPU pipeline 60 interacts with vertex cache/buffer 72. Similar to vertex cache/buffer 38 shown in FIGS. 2A-2B, vertex cache/buffer 72 includes distinct storage areas for vertex coordinates and vertex attributes: coordinate storage area 74 and attribute storage area 76.

Similar to GPU pipeline 30, GPU pipeline 60 stores and retrieves vertex coordinate and vertex attribute data when interacting with vertex cache/buffer 72. For example, vertex shader 64 may store vertex coordinates within coordinate storage area 74. Primitive setup module 66 may then retrieve the vertex coordinates for vertices of primitives within an image geometry to identify and reject invisible primitives. However, unlike GPU pipeline 30, GPU pipeline 60 provides output from primitive setup module 66 only to scan converter 68 and early Z module 70. Scan converter 68 performs rasterization functions to generate pixels, and early Z module 70 may reject any hidden surfaces.

The visible primitives are then passed to second vertex fetcher/decoder 78, which may then perform hit/miss checking for the vertex indices of these primitives. Vertex fetcher/decoder 78 may then fetch and decode non-coordinate attributes for these vertices, such that second vertex shader 80 may generate vertex attributes (e.g., color, normal, texture) for the vertices and store these attributes within attribute storage area 76. Deferred attribute setup and interpolation module 82, pixel/fragment shader 84, and post-processing module 86 may then perform functions that are similar to deferred attribute setup and interpolation module 52, pixel/fragment shader 54, and post-processing module 56 (FIGS. 2A-2B) in order to process the data for display.

GPU pipeline 60 may provide certain advantages. For example, because vertex fetcher/decoder 78 receives output from early Z module 70, vertex fetcher/decoder 78 and vertex shader 80 need not necessarily have to process vertex indices or compute vertex attributes for vertices of any hidden surfaces. Early Z module 70 may remove one or more of such hidden surfaces from further processing, which may save processing bandwidth of vertex fetcher/decoder 78 and vertex shader 80. (In the example of FIGS. 2A-2B, vertex fetcher/decoder 48 and vertex shader 50 operate substantially in parallel with scan converter 44 and early Z module 46. In such an example, it is possible that vertex fetcher/decoder 48 and vertex shader 50 may need to spend cycles processing vertices of potentially hidden surfaces.) However, in many situations, a much larger number of primitives may be rejected by primitive setup module 66 than by early Z module 70, which may mitigate this potential advantage of the example of GPU pipeline 60. (For example, a great majority of primitives may be rejected by primitive setup module 66 as invisible, while only a much smaller percentage of primitives/pixels for surfaces may be rejected by early Z module 70 as being hidden.)

When compared to GPU pipeline 30, GPU pipeline 60 may also have certain limitations. Because vertex fetcher/decoder 78 and vertex shader 80 do not substantially operate in parallel with scan converter 68 and early Z module 70, as in the example of FIGS. 2A-2B, there may be an increase in pipeline latency.

In addition, in certain cases, the data (e.g., pixels/primitives) output from early Z module 70 may need to be buffered and then subsequently retrieved by attribute setup and interpolation module 82. As previously described in reference to FIGS. 2A-2B, an attribute setup and interpolation module typically incorporates and utilizes the information provided by both an early Z module and a second vertex shader that calculates vertex attributes. Thus, in the example of FIGS. 3A-3B, early Z module 70 may need to store its output data into a buffer (e.g., a separate FIFO (first in, first out) buffer). After vertex shader 80 has stored vertex attribute information into attribute storage area 76, deferred attribute setup and interpolation module 82 may then need to retrieve the vertex attributes from vertex cache/buffer 72 and also retrieve the buffered information that was stored by early Z module 70. This additional buffering and design cost may add extra overhead that can be potentially avoided or minimized by the example shown in FIGS. 2A-2B. In the example of FIGS. 2A-2B, scan converter 44 and early Z module 46 operate substantially in parallel with vertex fetcher/shader 48 and vertex shader 50.

Figure 4:
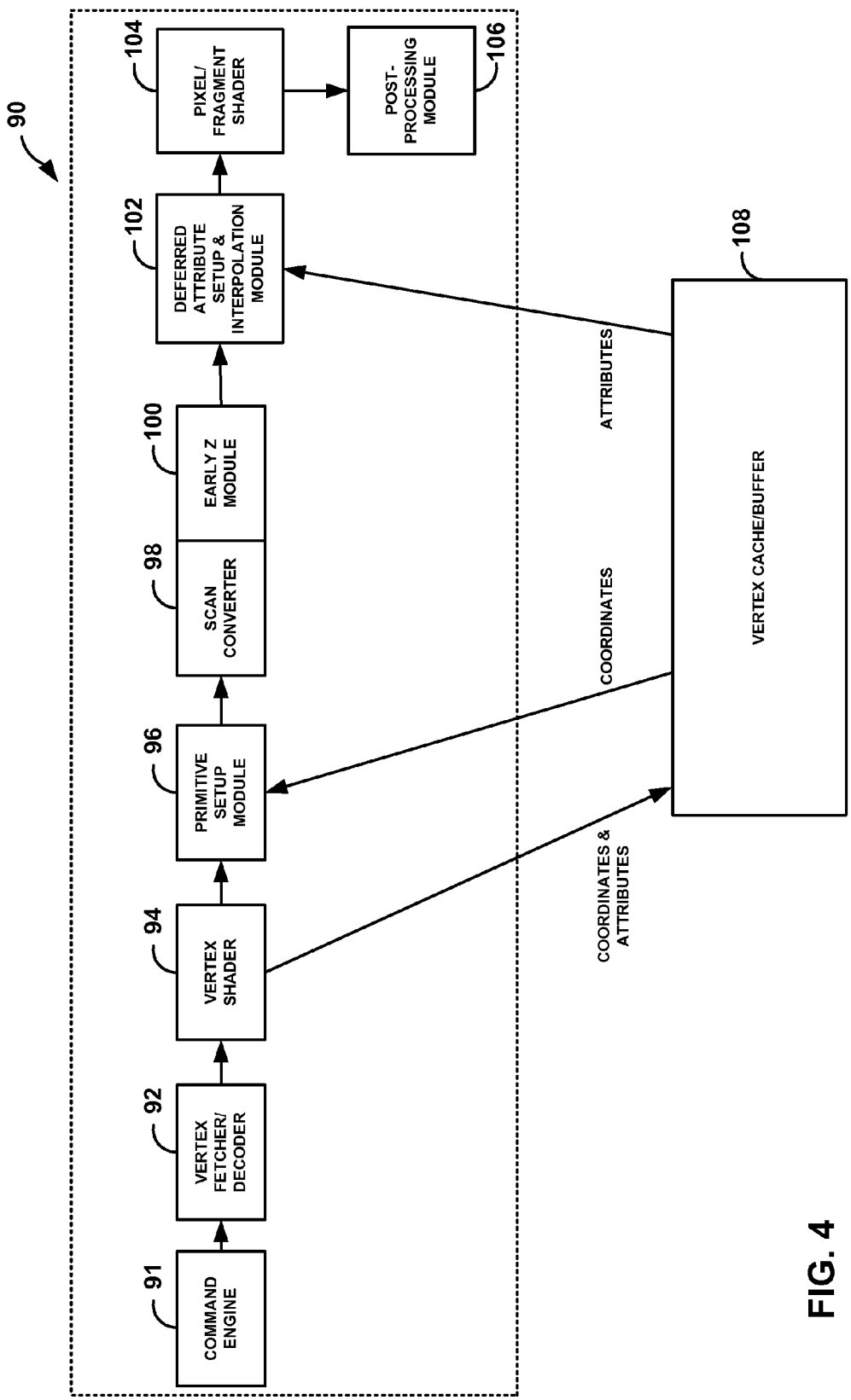
FIG. 4 is a block diagram illustrating an example GPU pipeline in which the implementation of multiple vertex fetcher/shader mechanism has been disabled.

FIG. 4 is a block diagram illustrating an example GPU pipeline 90 in which the implementation of multiple vertex fetcher/shader mechanism has been disabled. In some instances, the use of a deferred vertex fetcher/shader mechanism may be configurable. The mechanism may be enabled or configured by a driver that is executable within the GPU (e.g., GPU 14). For example, in the example of FIGS. 2A-2B, a driver executable by controller 12 may selectively disable vertex stream fetcher/decoder 48 and vertex shader 50 when it determines that any benefits or processing efficiencies may be minimal.

In one scenario, the driver may determine that the deferred processing of vertex coordinates by vertex shader 34 and vertex attributes by vertex shader 50 may not provide significant processing or power savings over a single vertex shader that computes both vertex coordinates and attributes. In this case, the driver may disable vertex fetcher/decoder 48 and vertex shader 50. In some cases, the driver may make this determination based upon statistics provided from compilation of graphics instructions that are accessible by the driver. In some instances, the driver may make this determination based upon the processing of prior frames of data for the given image geometry.

GPU pipeline 90 of FIG. 4 shows an example implementation when a second vertex fetcher/decoder and vertex shader have been disabled, and where only a single vertex fetcher/decoder and vertex shader are utilized. GPU pipeline 90 includes a command engine 91, a single vertex fetcher/decoder 92, a vertex shader 94, a primitive setup module 96, a scan converter 98, an early Z module 100, a deferred attribute setup and interpolation module 102, a pixel/fragment shader 104, and a post-processing module 106.

In one example, for purposes of illustration, command engine 91 functions similarly to command engine 30 (FIG. 2A), receiving graphics commands and an image geometry. Unlike vertex fetcher/decoder 32, however, vertex fetcher/ decoder 92 of FIG. 4 fetches all attributes for the vertices, based upon the vertex indices, including both coordinate and non-coordinate based attributes. Vertex shader 94 then generates both a set of vertex coordinates and vertex attributes for the vertices of primitives contained in the received image geometry, and stored these in a vertex cache/buffer 108.

Vertex cache/buffer 108 shown in FIG. 4 is managed as one combined cache, as opposed, for example, to vertex cache/buffer 38 shown in FIGS. 2A-2B, which includes separate storage areas (40, 42) for vertex coordinates and attributes. In another aspect, vertex cache/buffer 108 may include separate storage areas for vertex coordinates and attributes. Primitive setup module 96 retrieves the vertex coordinates for all vertices of primitives contained in the image geometry and rejects any invisible primitives. Scan converter 98 rasterizes the visible primitives into pixels, and early Z module 100 may further remove any hidden primitives/pixels (e.g., surfaces).

Deferred attribute setup and interpolation module 102 receives the output from early Z module 100, and also retrieves the vertex attributes for all of the visible primitive vertices from vertex cache/buffer 108. Deferred attribute setup and interpolation module 102 performs attribute setup and interpolation only for those attributes that correspond to vertices of primitives that have not been rejected (e.g., to vertices of primitives that are visible and surfaces of visible primitives that are not hidden). Pixel/fragment shader 104 and post-processing module 106 function similar to pixel/fragment shader 54 and post-processing module 56 shown in FIG. 2B.

Figure 5:
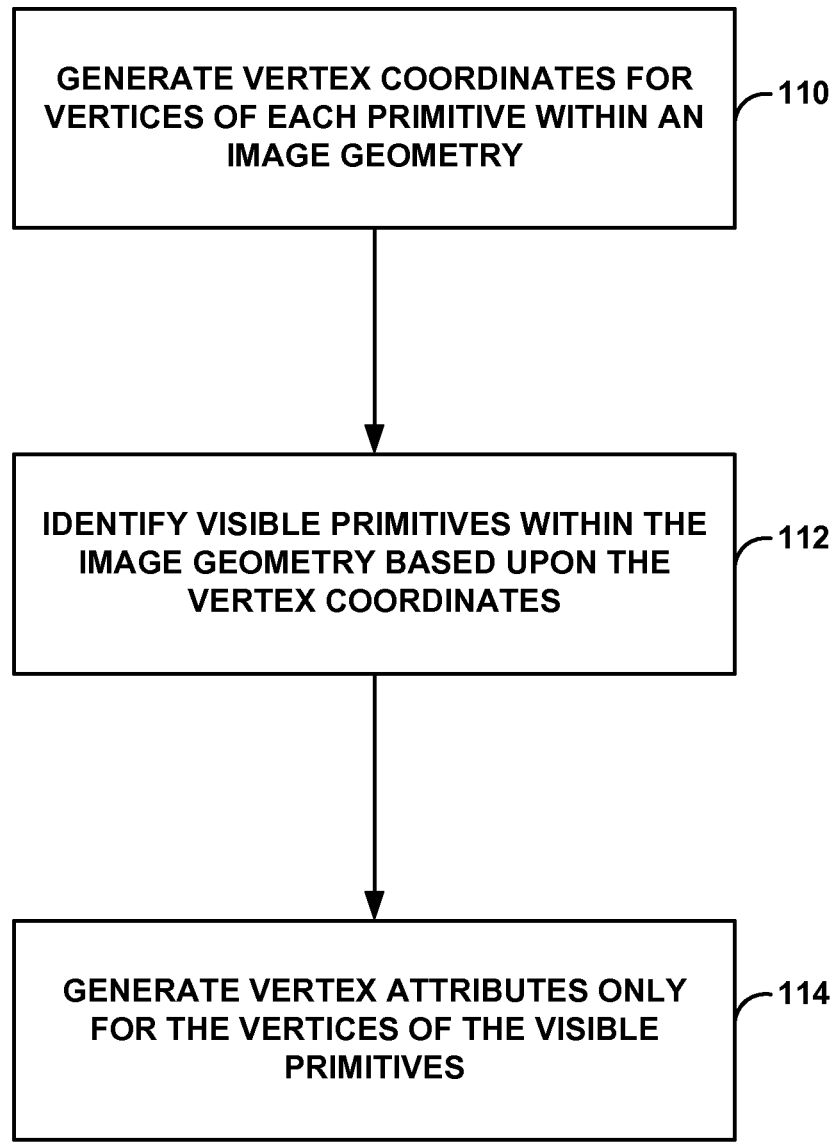
FIG. 5 is a flow diagram illustrating an example method that may be performed by components within a GPU pipeline, such as the GPU shown in FIGS. 2A-2B and/or FIGS. 3A-3B.

FIG. 5 is a flow diagram illustrating an example method that may be performed by various components of a GPU pipeline, such as GPU pipeline 30 and/or 60 shown in FIGS. 2A-2B and FIGS. 3A-3B. For purposes of illustration only, it will be assumed that the method shown in FIG. 5 is performed by GPU pipeline 30 shown in FIGS. 2A-2B.

Vertex shader 34 may generate, within GPU processing pipeline 30, vertex coordinates for vertices of each primitive within an image geometry that is received by command engine 31 from a controller, such as controller 12 shown in FIG. 1 (110). Command engine 31 may also receive rendering commands from the controller. The vertex coordinates may comprise a location and a perspective parameter, and the image geometry may represent a graphics image. In some instances, vertex shader 34 may generate the vertex coordinates during a determination of surface properties of the graphics image at the vertices of each primitive within the image geometry.

Primitive setup module 36 may identify visible primitives within the image geometry based upon the vertex coordinates (112). In some cases, primitive setup module 36 may identify the visible primitives by rejecting invisible primitives within the image geometry based upon the vertex coordinates.

Responsive to identifying the visible primitives, vertex shader 50 may generate, within GPU pipeline 30, vertex attributes (e.g., color, texture, transparency) only for the vertices of the visible primitives in order to determine surface properties of the graphics image (114). The vertex attributes may be used to generate a representation of the visible primitives based upon the rendering commands that are executed by GPU pipeline 30. In one aspect, vertex shader 50 may generate the vertex attributes only for the vertices of the visible primitives only when such generation is enabled. As described above, a driver of the GPU may, in certain instances, disable the deferred functionality of using multiple vertex fetchers/decoders and vertex shaders. When disabled, vertex fetcher/decoder 48 and vertex shader 50 may not be utilized, and the GPU may implement the GPU pipeline 90 that is shown in FIG. 4.

Vertex shader 34 may obtain coordinate attributes for the vertices of each primitive in the image geometry from vertex fetcher/decoder 32. Vertex shader 34 may then generate the vertex coordinates for the vertices of each primitive based upon the coordinate attributes of the vertices that are received from vertex fetcher/decoder 32. Vertex shader 34 may store the vertex coordinates in a first dedicated area of a vertex buffer, such as within coordinate storage area 40 within vertex cache/buffer 38. (As described previously, vertex cache/buffer 38 may include a second dedicated area, attribute storage area 42, that stores vertex attributes that have been generated by vertex shader 50.)

In one aspect, vertex shader 50 may obtain non-coordinate attributes for the vertices of each visible primitive from vertex fetcher/decoder 48. Vertex shader 50 may then generate the vertex attributes for the vertices of each visible primitive based upon the non-coordinate attributes of the vertices. These vertex attributes may be stored in attribute storage area 42 of vertex cache/buffer 38 for later retrieval by attribute setup and interpolation module 52.

Early Z module 46, shown in FIG. 2A, is capable of removing one or more hidden surfaces of at least one of the visible primitives based upon relative positions of the one or more hidden surfaces with respect to at least another one of the visible primitives. For example, if a surface of a visible primitive is located entirely behind another primitive within an image geometry, that surface may be hidden from view. In this instance, early Z module 46 may remove this hidden surface. Early Z module 46 may perform any of its operations substantially in parallel those performed by vertex shader 50. For example, early Z module 46 may remove hidden surfaces while vertex shader 50 obtains the non-coordinate attributes from vertex fetcher/decoder 48 and generates vertex attributes only for the vertices of the visible primitives. Vertex shader 50 may store the generated vertex attributes within attribute storage area 42 of vertex cache/buffer 38.

As described previously, in some examples, the second vertex fetcher/decoder and vertex shader may be located downstream of the early Z module, as shown in the example of FIGS. 3A-3B. In that example, vertex fetcher/decoder 78 receives output directly from early Z module 70. Thus, early Z module 70 and vertex fetcher/decoder 78 perform their functionality in series, rather than in parallel. Early Z module 70 may remove hidden surfaces of visible primitives before vertex shader 80 obtains non-coordinate attributes from vertex fetcher/decoder 78 and generates the vertex attributes for the vertices of these visible primitives.

Vertex shader 80 may obtain, or receive, non-coordinate attributes for the vertices of each visible primitive from vertex fetcher/decoder 78. Vertex shader 80 may then generate the vertex attributes for the vertices of each visible primitive based upon the non-coordinate attributes of the vertices, and store these vertex attributes in attribute storage area 76.

Figure 6A:
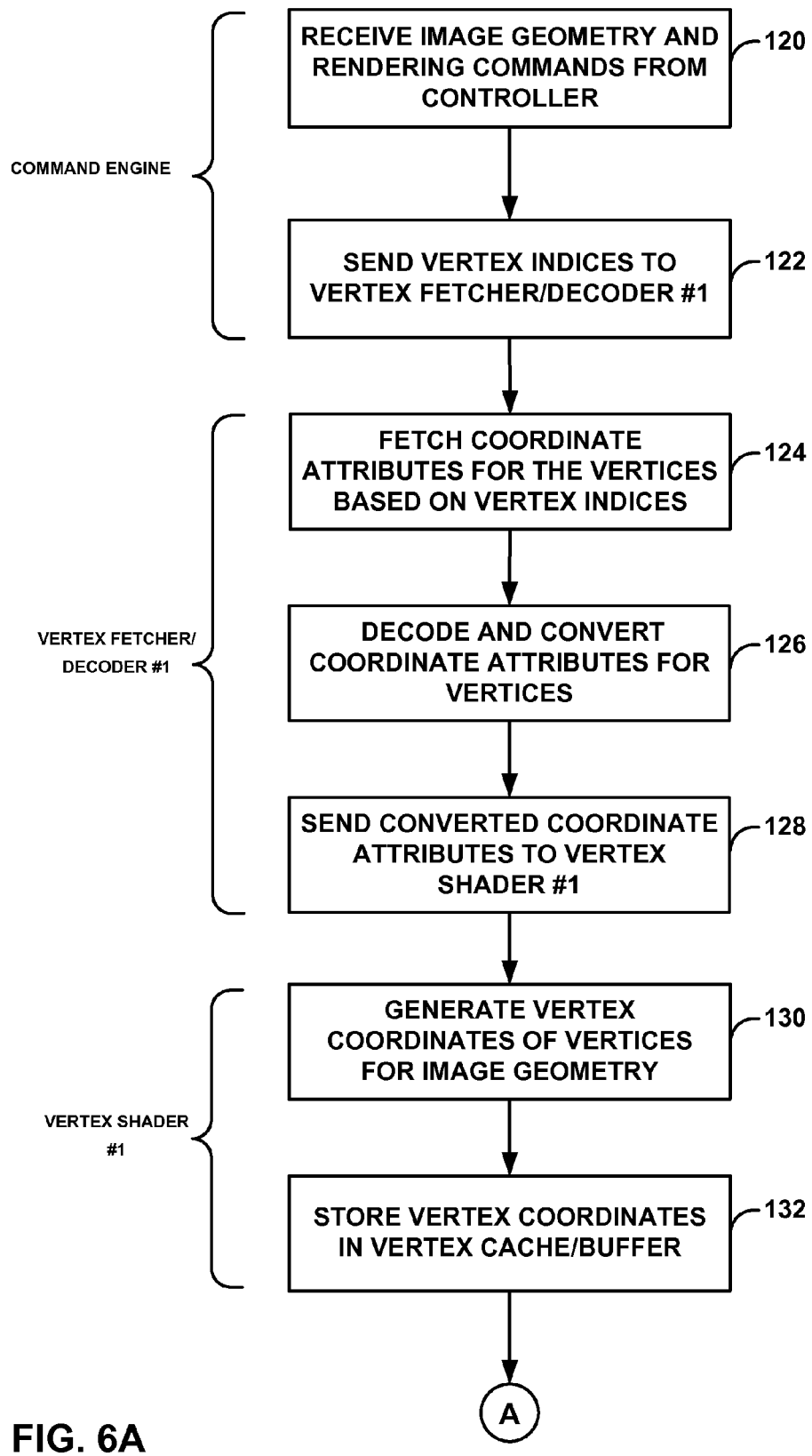
FIGS. 6A-6C illustrate a flow diagram of an example method that may be performed by various components within a GPU pipeline, such as the GPU shown in FIGS. 2A-2B.
Figure 6B:
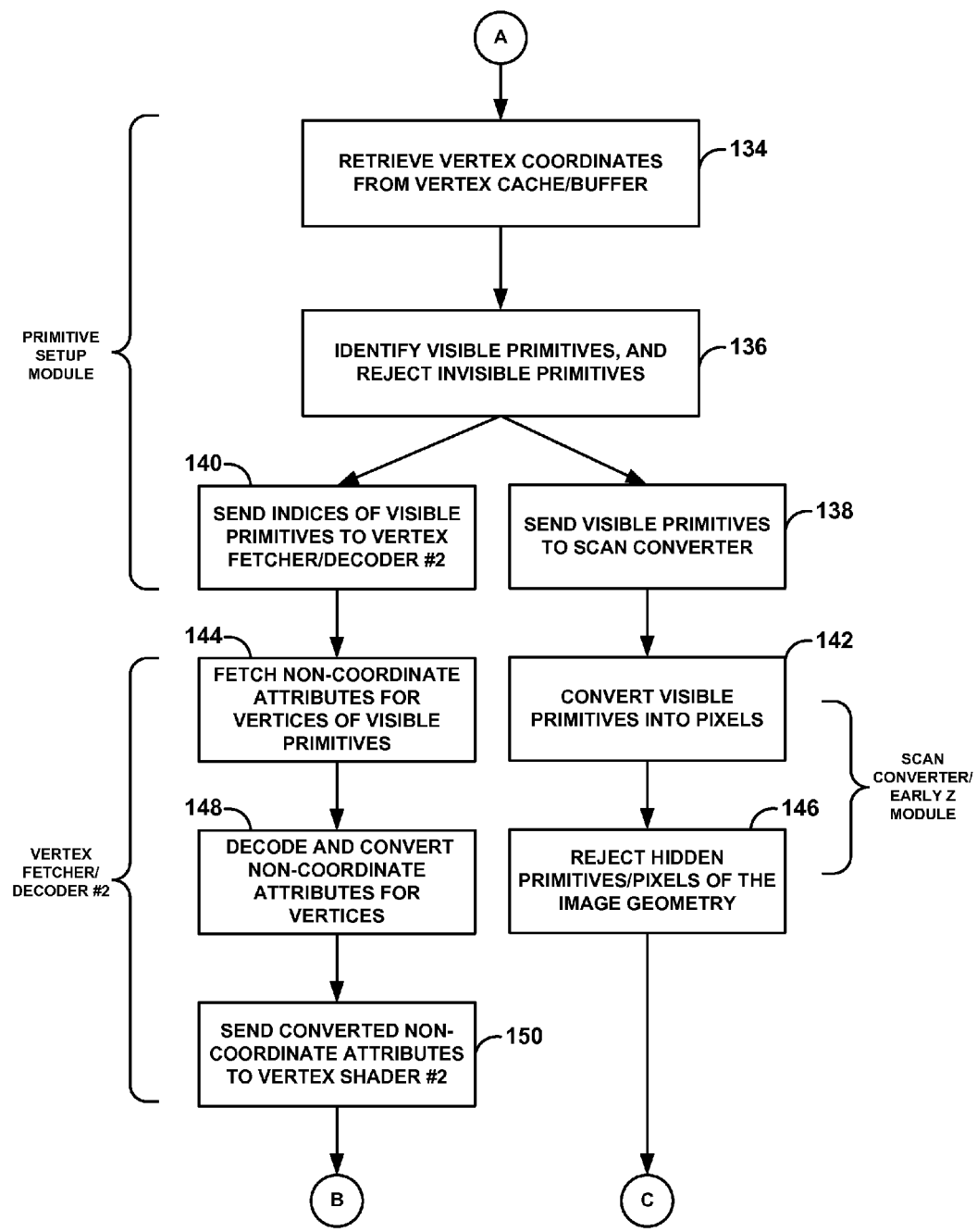
Figure 6C:
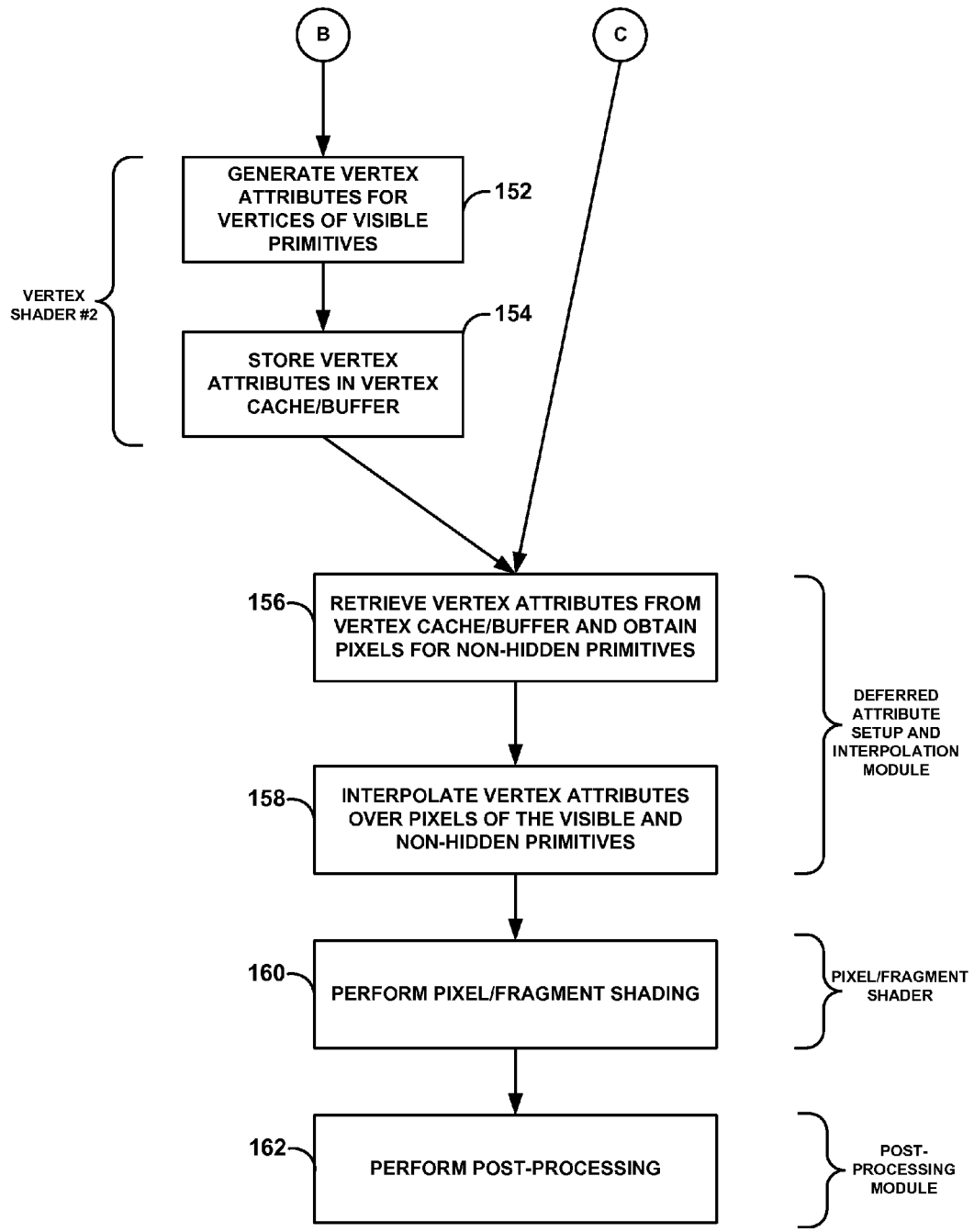

FIGS. 6A-6C illustrate a flow diagram of an example method that may be performed by various components of a GPU pipeline, such as the GPU pipeline 30 shown in FIGS. 2A-2B. FIGS. 6A-6C also indicate various components within the GPU pipeline that may performs the indicated acts. For purposes of illustration, it will be assumed that the method shown in FIGS. 6A-6C is performed by components of GPU pipeline 30.

Referring initially to FIG. 6A, command engine 31 may receive an image geometry and rendering command from a controller, such as from controller 12 of device 2 shown in FIG. 1 (120). Command engine 31 then sends vertex indices to first vertex fetcher/decoder 32 (122). The vertex indices relate to the vertices of primitives that are contained within the image geometry.

Vertex fetcher/decoder 32 may fetch coordinate attributes (e.g., attributes related to location and perspective) for the vertices based on the vertex indices (124). For example, vertex fetcher/decoder 32 may perform hit/miss checking for the coordinate attributes with respect to a vertex cache mechanism (e.g., vertex cache/buffer 38), and may fetch attributes from a separate memory buffer (e.g., internal memory 24) for missed vertices. Vertex fetcher/decoder 32 may decode attribute formats and convert them to internal formats that may be recognizable or acceptable by vertex shader 34 (126). Vertex fetcher/decoder 32 may then send the converted coordinate attributes to the first vertex shader 34 (128).

Upon receipt of the coordinate attribute information from vertex fetcher/decoder 32, vertex shader 34 generates vertex coordinates (e.g., XYZW coordinates for location and perspective) of vertices for primitives contained within the image geometry (130). Vertex shader 34 may store these vertex coordinates within coordinate storage area 40 within vertex cache/buffer 38 (132). In addition, vertex shader 34 may provide cache index values, which may have been computed by vertex fetcher/decoder 32, for the stored vertex coordinates to primitive setup module 36.

Referring now to FIG. 6B, primitive setup module 36 may retrieve the vertex coordinates from coordinate storage area 40 of vertex cache/buffer 38 (134). Primitive setup module 36 may use the cache index values provided by vertex shader 34 to locate the vertex coordinates for retrieval within coordinate storage area 40. Primitive setup module 36 identifies visible primitives within the image geometry, and rejects invisible primitives, based upon the vertex coordinates of the primitives within the image geometry (136). For example, the vertex coordinates for a particular primitive may fall outside the boundary of a viewing area, of viewport. In some instances, the location and position of the viewport may be defined by an application, by the device, or specified by rendering commands that are received by command engine 31. In some instances, primitive setup module 36 may reject a primitive after performing backface culling. Backface culling may determine which primitives may not visible to a viewer because they are not oriented towards, or facing, the viewer. These primitives may be rejected by primitive setup module 36.

In the example GPU pipeline of FIGS. 2A-2B, primitive setup module 36 may send indices of vertices of visible primitives to second vertex fetcher/decoder 48 (140). Substantially in parallel, primitive setup module 36 may also provide the visible primitives to scan converter 44 (138). Scan converter 44 may convert the visible primitives into pixels (142). Early Z module 46 may remove any hidden primitives/pixels (e.g., surfaces) of the image geometry (146). Primitives or pixels within primitives may be considered hidden, and therefore be removed from consideration during processing of a specific frame of the image, when the primitives or the pixels within primitives are located behind another object within the image frame, or are transparent within the image frame.

While scan converter 44 and early Z module 46 are performing their individual operations, vertex fetcher/decoder 48 and vertex shader 50 may also be performing certain operations. Vertex fetcher/decoder 48 may use the indices provided by primitive setup module 36 to fetch non-coordinate attributes (e.g., attributes not related to XYZW coordinates) for the vertices of the visible primitives (144). Vertex fetcher/decoder 48 may decode and convert the non-coordinate attributes for the vertices (148) and then send the converted non-coordinate attributes to the second vertex shader 50 (150).

Referring now to FIG. 6C, vertex shader 50 may generate vertex attributes (e.g., color, texture) for each of the vertices of the visible primitives within the image geometry (152). Vertex shader 50 may then store the vertex attributes within the attribute storage area 42 of vertex cache/buffer 38 (154). In addition, vertex shader 50 may provide cache index values for the stored vertex attributes to deferred attribute setup and interpolation module 52. These cache index values may be computed by vertex fetcher/decoder 48 and provided to vertex shader 50.

Attribute setup and interpolation module 52 may retrieve these vertex attributes from attribute storage area 42 of vertex cache/buffer 38 (156). Attribute setup and interpolation module 52 may use the cache index values provided by vertex shader 50 to locate the vertex attributes for retrieval within attribute storage area 42. Attribute setup and interpolation module 52 may also obtain pixels for primitives from early Z module 46 that have not been rejected. Attribute setup and interpolation module 52 may then interpolate the vertex attributes over pixels of the visible primitives based, for example, on attribute gradient values (158).

By deferring certain functionality of fetching, decoding, and shading, GPU pipeline 30 may limit the number of attributes that need to be processed by attribute setup and interpolation module 52, thereby increasing the efficiency at which attribute setup and interpolation module 52 may operate. Attribute setup and interpolation module 52 may only need to retrieve and process vertex attributes for vertices associated with visible primitives, as determined by primitive setup module 36, and for vertices that are also not part of hidden surfaces (as determined by early Z module 46).

Attribute setup and interpolation module 52 may provide the interpolated attribute values to pixel/fragment shader 54. Pixel/fragment shader 54 may then perform pixel/fragment shading of the primitives (160). Pixel/fragment shader 54 may determine surface properties of the image at pixels within the primitives for the image geometry. Results of pixel/fragment shader 54 can then be output to post-processing module 56. Post-processing module 56 may perform one or more post-processing operations (162), such as pixel blending operations, to prepare the pixels for display, such as on display device 20 shown in FIG. 1.

The techniques described in this disclosure may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-media applications and devices. In some aspects, for example, such components may form part of a mobile device, such as a wireless communication device handset.

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

The invention claimed is:

1. A method comprising:
   generating, within a processing pipeline of a graphics processing unit (GPU), vertex coordinates for vertices of each primitive within an image geometry, wherein the vertex coordinates comprise a location and a perspective parameter for each one of the vertices, and wherein the image geometry represents a graphics image;
   identifying, within the processing pipeline of the GPU, visible primitives within the image geometry based upon the vertex coordinates;
   removing one or more hidden surfaces of at least one of the visible primitives based upon relative positions of the one or more hidden surfaces with respect to at least another one of the visible primitives; and
   responsive to identifying the visible primitives, generating, within the processing pipeline of the GPU, vertex attributes only for the vertices of the visible primitives in order to determine surface properties of the graphics image.

2. The method of claim 1, wherein generating the vertex coordinates comprises generating the vertex coordinates during the determination of the surface properties of the graphics image at the vertices of each primitive within the image geometry.

3. The method of claim 1, wherein the vertex attributes comprise one or more of a color or texture parameter associated with each vertex.

4. The method of claim 1, further comprising using the vertex attributes to generate, within the processing pipeline of the GPU, a representation of the visible primitives based upon rendering commands received by the GPU.

5. The method of claim 1, further comprising obtaining coordinate attributes for the vertices of each primitive in the image geometry within the processing pipeline of the GPU, wherein generating the vertex coordinates comprises generating the vertex coordinates for the vertices of each primitive based upon the coordinate attributes of the vertices.

6. The method of claim 1, further comprising:
   storing the vertex coordinates in a first dedicated area of a vertex buffer;
   storing the vertex attributes in a second, different dedicated area of the vertex buffer.

7. The method of claim 1, wherein removing the one or more hidden surfaces is performed in parallel with generating the vertex attributes only for the vertices of the visible primitives.

8. The method of claim 1, wherein removing the one or more hidden surfaces is performed before generating the vertex attributes only for the vertices of the visible primitives.

9. The method of claim 1, further comprising obtaining non-coordinate attributes for the vertices of each visible primitive, and wherein generating the vertex attributes comprises generating the vertex attributes for the vertices of each visible primitive based upon the non-coordinate attributes of the vertices.

10. The method of claim 9, wherein removing the one or more hidden surfaces is performed in parallel with obtaining the non-coordinate attributes and generating the vertex attributes.

11. The method of claim 9, wherein removing the one or more hidden surfaces is performed before obtaining the non-coordinate attributes and generating the vertex attributes.

12. The method of claim 9, wherein generating the vertex attributes only for the vertices of the visible primitives occurs upon determining that the generation is enabled.

13. A device comprising:
   a graphics processing unit (GPU) that is configured to:
      generate, within a processing pipeline of the GPU, vertex coordinates for vertices of each primitive within an image geometry, wherein the vertex coordinates comprise a location and a perspective parameter for each one of the vertices, and wherein the image geometry represents a graphics image;
      identify, within the processing pipeline of the GPU, visible primitives within the image geometry based upon the vertex coordinates;
      remove one or more hidden surfaces of at least one of the visible primitives based upon relative positions of the one or more hidden surfaces with respect to at least another one of the visible primitives; and
      responsive to identifying the visible primitives, generate, within the processing pipeline of the GPU, vertex attributes only for the vertices of the visible primitives in order to determine surface properties of the graphics image.

14. The device of claim 13, wherein the GPU is configured to generate the vertex coordinates during the determination of the surface properties of the graphics image at the vertices of each primitive within the image geometry.

15. The device of claim 13, wherein the vertex attributes comprise one or more of a color or texture parameter associated with each vertex.

16. The device of claim 13, wherein the GPU is further configured to use the vertex attributes to generate, within the processing pipeline of the GPU, a representation of the visible primitives based upon rendering commands received by the GPU.

17. The device of claim 13, wherein the GPU is further configured to obtain coordinate attributes for the vertices of each primitive in the image geometry within the processing pipeline of the GPU, and wherein the GPU is configured to generate the vertex coordinates for the vertices of each primitive based upon the coordinate attributes of the vertices.

18. The device of claim 13, further comprising an on-chip vertex buffer having first and second dedicated areas, wherein the GPU is further configured to store the vertex coordinates in the first dedicated area of the vertex buffer, and to store the vertex attributes in the second dedicated area of the vertex buffer.

19. The device of claim 13, wherein the GPU is configured to remove the one or more hidden surfaces in parallel with generating the vertex attributes only for the vertices of the visible primitives.

20. The device of claim 13, wherein the GPU is configured to remove the one or more hidden surfaces before generating the vertex attributes only for the vertices of the visible primitives.

21. The device of claim 13, wherein the GPU is further configured to obtain non-coordinate attributes for the vertices of each visible primitive, and wherein the GPU is configured to generate the vertex attributes for the vertices of each visible primitive based upon the non-coordinate attributes of the vertices.

22. The device of claim 21, wherein the GPU is configured to remove the one or more hidden surfaces in parallel with obtaining the non-coordinate attributes and generating the vertex attributes.

23. The device of claim 21, wherein the GPU is configured to remove the one or more hidden surfaces before obtaining the non-coordinate attributes and generating the vertex attributes.

24. The device of claim 21, wherein the GPU is configured to generate the vertex attributes only for the vertices of the visible primitives upon determining that the generation is enabled.

25. The device of claim 13, wherein the device comprises a wireless communication device handset.

26. The device of claim 13, wherein the device comprises one or more integrated circuit devices.

27. A non-transitory computer-readable storage medium comprising executable instructions for causing one or more processors to:
  generate, within a processing pipeline of a graphics processing unit (GPU), vertex coordinates for vertices of each primitive within an image geometry, wherein the vertex coordinates comprise a location and a perspective parameter for each one of the vertices, and wherein the image geometry represents a graphics image;
  identify, within the processing pipeline of the GPU, visible primitives within the image geometry based upon the vertex coordinates;
  remove one or more hidden surfaces of at least one of the visible primitives based upon relative positions of the one or more hidden surfaces with respect to at least another one of the visible primitives; and
  responsive to identifying the visible primitives, generate, within the processing pipeline of the GPU, vertex attributes only for the vertices of the visible primitives in order to determine surface properties of the graphics image.

28. The non-transitory computer-readable storage medium of claim 27, wherein the instructions for causing the one or more processors to generate the vertex coordinates comprise instructions for causing the one or more processors to generate the vertex coordinates during the determination of the surface properties of the graphics image at the vertices of each primitive within the image geometry.

29. The non-transitory computer-readable storage medium of claim 27, wherein the vertex attributes comprise one or more of a color or texture parameter associated with each vertex.

30. The non-transitory computer-readable storage medium of claim 27, further comprising instructions for causing the one or more processors to use the vertex attributes to generate, within the processing pipeline of the GPU, a representation of the visible primitives based upon rendering commands received by the GPU.

31. The non-transitory computer-readable storage medium of claim 27, further comprising instructions for causing the one or more processors to obtain coordinate attributes for the vertices of each primitive in the image geometry within the processing pipeline of the GPU, wherein the instructions for causing the one or more processors to generate the vertex coordinates comprise instructions for causing the one or more processors to generate the vertex coordinates for the vertices of each primitive based upon the coordinate attributes of the vertices.

32. The non-transitory computer-readable storage medium of claim 27, further comprising instructions for causing the one or more processors to:
  store the vertex coordinates in a first dedicated area of a vertex buffer;
  store the vertex attributes in a second, different dedicated area of the vertex buffer.

33. The non-transitory computer-readable storage medium of claim 27, wherein the instructions for causing the one or more processors to remove the one or more hidden surfaces comprise instructions for causing the one or more processors to remove the one or more hidden surfaces in parallel with generating the vertex attributes only for the vertices of the visible primitives.

34. The non-transitory computer-readable storage medium of claim 27, wherein the instructions for causing the one or more processors to remove the one or more hidden surfaces comprise instructions for causing the one or more processors to remove the one or more hidden surfaces before generating the vertex attributes only for the vertices of the visible primitives.

35. The non-transitory computer-readable storage medium of claim 27, further comprising instructions for causing the one or more processors to obtain non-coordinate attributes for the vertices of each visible primitive, and wherein the instructions for causing the one or more processors to generate the vertex attributes comprise instructions for causing the one or more processors to generate the vertex attributes for the vertices of each visible primitive based upon the non-coordinate attributes of the vertices.

36. The non-transitory computer-readable storage medium of claim 35, wherein the instructions for causing the one or more processors to remove the one or more hidden surfaces comprise instructions for causing the one or more processors to remove the one or more hidden surfaces in parallel with obtaining the non-coordinate attributes and generating the vertex attributes.

37. The non-transitory computer-readable storage medium of claim 35, wherein the instructions for causing the one or more processors to remove the one or more hidden surfaces comprise instructions for causing the one or more processors to remove the one or more hidden surfaces before obtaining the non-coordinate attributes and generating the vertex attributes.

38. The non-transitory computer-readable storage medium of claim 35, wherein the instructions for causing the one or more processors to generate the vertex attributes only for the vertices of the visible primitives comprise instructions for causing the one or more processors to generate the vertex attributes only for the vertices of the visible primitives upon determining that the generation is enabled.

39. A device comprising:
means for generating, within a processing pipeline of a graphics processing unit (GPU), vertex coordinates for vertices of each primitive within an image geometry, wherein the vertex coordinates comprise a location and a perspective parameter for each one of the vertices, and wherein the image geometry represents a graphics image;
means for identifying, within the processing pipeline of the GPU, visible primitives within the image geometry based upon the vertex coordinates;
means for removing one or more hidden surfaces of at least one of the visible primitives based upon relative positions of the one or more hidden surfaces with respect to at least another one of the visible primitives; and
means, responsive to identifying the visible primitives, for generating, within the processing pipeline of the GPU, vertex attributes only for the vertices of the visible primitives in order to determine surface properties of the graphics image.

40. The device of claim 39, wherein the means for generating the vertex coordinates comprises means for generating the vertex coordinates during the determination of the surface properties of the graphics image at the vertices of each primitive within the image geometry.

41. The device of claim 39, wherein the vertex attributes comprise one or more of a color or texture parameter associated with each vertex.

42. The device of claim 39, further comprising means for using the vertex attributes to generate, within the processing pipeline of the GPU, a representation of the visible primitives based upon rendering commands received by the GPU.

43. The device of claim 39, further comprising means for obtaining coordinate attributes for the vertices of each primitive in the image geometry within the processing pipeline of the GPU, wherein the means for generating the vertex coordinates comprises means for generating the vertex coordinates for the vertices of each primitive based upon the coordinate attributes of the vertices.

44. The device of claim 39, further comprising:
means for storing the vertex coordinates in a first dedicated area of a vertex buffer;
means for storing the vertex attributes in a second, different dedicated area of the vertex buffer.

45. The device of claim 39, wherein the means for removing the one or more of the hidden surfaces comprises means for removing the one or more of the hidden surfaces in parallel with generating the vertex attributes only for the vertices of the visible primitives.

46. The device of claim 39, wherein the means for removing the one or more of the hidden surfaces comprises means for removing the one or more of the hidden surfaces before generating the vertex attributes only for the vertices of the visible primitives.

47. The device of claim 39, further comprising means for obtaining non-coordinate attributes for the vertices of each visible primitive, and wherein the means for generating the vertex attributes comprises means for generating the vertex attributes for the vertices of each visible primitive based upon the non-coordinate attributes of the vertices.

48. The device of claim 47, wherein the means for removing the one or more of the hidden surfaces comprises means for removing the one or more of the hidden surfaces in parallel with obtaining the non-coordinate attributes and generating the vertex attributes.

49. The device of claim 47, wherein the means for removing the one or more of the hidden surfaces comprises means for removing the one or more of the hidden surfaces before obtaining the non-coordinate attributes and generating the vertex attributes.

50. The device of claim 47, wherein the means for generating the vertex attributes only for the vertices of the visible primitives comprises means for generating the vertex attributes only for the vertices of the visible primitives upon determining that the generation is enabled.

* * * * *